United States Patent [19]
Jones

[11] Patent Number: 5,769,562
[45] Date of Patent: Jun. 23, 1998

[54] EDGE RESTRAINT APPARATUS HAVING VARIABLE LENGTH SECTIONS

[76] Inventor: Stephen Jones, 10800 Morris Ave. South, Bloomington, Minn. 55437

[21] Appl. No.: 780,702

[22] Filed: Jan. 8, 1997

[51] Int. Cl.⁶ .............................. E01C 11/22; E04B 1/00; E04C 3/30
[52] U.S. Cl. ................................ 404/7; 52/100; 52/720.1
[58] Field of Search ........................... 404/7; 52/98, 100, 52/720.1; 49/33

[56] References Cited

U.S. PATENT DOCUMENTS

| Re. 33,550 | 3/1991 | Jones . | |
|---|---|---|---|
| 850,866 | 4/1907 | De Clements | 404/7 |
| 3,422,584 | 1/1969 | Howard | 52/98 |
| 5,073,061 | 12/1991 | Jones | 404/7 |
| 5,205,090 | 4/1993 | Lavery | 52/102 |
| 5,240,343 | 8/1993 | Strobl, Jr. . | |
| 5,375,941 | 12/1994 | Strobl, Jr. | 404/7 |
| 5,377,447 | 1/1995 | Fritch | 47/33 |
| 5,640,801 | 6/1997 | Rynberk | 47/33 |

FOREIGN PATENT DOCUMENTS

| 2414584 | 1/1978 | France | 404/7 |

OTHER PUBLICATIONS

Border Concepts, "Iron Edge Galvanized Steel Paver Restraints," www.borderconcepts.com, undated.

Valley View Specialties Co., "Diamond–Lok," undated.

*Primary Examiner*—Tamara L. Graysay
*Assistant Examiner*—Gary S. Hartmann
*Attorney, Agent, or Firm*—Evenson, McKeown, Edwards & Lenahan, P.L.L.C.

[57] ABSTRACT

An edge restrain apparatus for restraining a hard structure, including a substantially upright section having a height; and a base section extending from a lower end of the upright section on at least one lateral side thereof. The base section is essentially perpendicular to the upright section and has a width. At least one of the height of the upright section and the width of the base section is variable. The upright section and/or the base section may be provided with longitudinal weakened portions such as indentations, score lines, or different material properties, in order to allow an unwanted portion of the section to be severed and removed. Extension sections may be provided which are engageable with the upright section and/or the base section.

24 Claims, 5 Drawing Sheets

5,769,562

EDGE RESTRAINT APPARATUS HAVING VARIABLE LENGTH SECTIONS

BACKGROUND AND SUMMARY OF THE INVENTION

The present invention is directed to an edge restraint apparatus for restraining hard surfaces and structures such as paving stones in a predetermined boundary, and more particularly to an edge restraint apparatus having variable length sections.

Edge restraint apparatus for restraining hard structures, such as landscape, pavement, wall or erosion control structures, are known. One such edge restraint device is described in detail in U.S. Patent Re. 33,550, the entire disclosure of which is incorporated herein by reference. Another like edge restraint is disclosed in U.S. Pat. No. 5,240, 343.

Edge restraint apparatus are used to restrain hard structures having varying dimensions, borders, and densities, and are installed in varying installation conditions, for example, on various types of base surfaces and in various climates. The height and the width of the known edge restraint apparatus are not adjustable. Consequently, the known edge restraint apparatus cannot be adapted to variously sized hard structures to be restrained, and does not allow adjustability at the installation site based on local installation conditions. Although the known edge restraint apparatus may be made in different sizes, it is costly to manufacture, as well as to inventory, custom sizes.

Consequently, there is a need for an edge restraint apparatus which is adaptable to varying sized hard structures and borders to be restrained, as well as varying installation conditions, and which is relatively inexpensive to manufacture.

These and other needs have been met according to the present invention by providing an edge restraint apparatus for restraining a hard structure, comprising a substantially upright section (such as for example a strip of material forming a wall) having a height, and a base section (such as for example a strip of material) extending from a lower end of the upright section on at least one lateral side, the base section being essentially perpendicular to the upright section and having a width (in a direction essentially perpendicular to the upright section), wherein at least one of the height of the upright section and the width of the base section is variable.

According to one preferred embodiment of the present invention, the edge restraint apparatus comprises an inverted T-shaped structure, including a substantially upright restraining section, and a base section disposed essentially perpendicular to the upright restraining section and extending on at least one and preferably both lateral sides of the upright restraining section. The upright restraining section forms a wall. The base section may be formed as a strip or belt of material extending from the upright section. At least one of the upright restraining section and the base section is provided with a weakened portion extending in the longitudinal direction which allows a part of the section to be severed and removed, for example by breaking, tearing, cutting, or the like at the weakened portion, in order to adjust the height of the upright restraining section or the width of the base section, as desired. The weakened portion may comprise an indentation, a cut or score line, or may be formed by creating different material properties, for example by using a different material or by applying an appropriate material treatment or curing process to the sections to form the weakened portion such that they may be broken-off. The weakened portion in the form of an indentation reduces the cross-section of the section, allowing the section to be severed at the indentation thereby allowing part of the section to be removed. According to certain preferred embodiments, the indentation is V-shaped in cross-section, which helps to promote a clean break of the extension section at the base of the V-shape. However, the indentation may have a U-shaped cross-section, a rectangular cross-section, or any other desired shape.

According to certain preferred embodiments, a plurality of indentations are provided on each of the upright restraining section, and on the base section on both sides of the upright restraining section. By providing multiple indentations, the adaptability of the edge restraint apparatus is increased, since a wider variety of sizes can be obtained by breaking the extension section at any desired indentation. By providing indentations on both the upright restraining section and the base section, the adjustability of the edge restraint apparatus is further improved by allowing both the height of the upright restraining section and the width of the base section on both lateral sides of the upright restraining section to be adjusted by breaking the edge restraint at any of the multiple indentaions.

According to further preferred embodiments of the present invention, the upright restraining section and the base section are formed as two separate components which are connectable to each other. In this way, upright restraining sections having varying heights can be formed, as well as base sections having varying widths. A user may advantageously select an upright restraining section having a desired height, and a base section having a desired width, and then connect the selected extension section together. The upright restraining section may be connected to the base section in any known manner, for example with a threaded connector, a spike, or an adhesive. According to one preferred embodiment, the upright restraining section includes at least one flanged portion extending laterally from the bottom end thereof. The upright restraining section may be provided with one flanged portion, forming an L-shaped configuration, or the upright restraining section may be provided with two flanged portions extending on both lateral sides hereof, forming an inverted T-shaped configuration. For ease of connection, the flanged portions may be provided with attachment openings such as holes or slots, and the base section may be provided with corresponding attachment openings for a connector such as a threaded connector or a spike, which can be placed through the attachment openings to secure the upright restraining section to the base section. However, the attachment openings are not necessary, since the upright restraining section may be adhesively connected to the base section, or a spike may be driven through the flanged portion and the base section to connect them together.

In an alternative embodiment, the upright section may be formed as an essentially planar component having attachment openings, with the base section having at least one flanged portion extending upwardly and having corresponding attachment openings. The base section may se provided with two upwardly extending flanged portions in order to form a slot which receives the planar upright section therebetween. According to further preferred embodiments, either or both of the upright restraining section and the base section may be provided with the above-described weakened portions, for example indentations, score lines, or different material properties, to allow for further adjustability of the height and/or width of the edge restraint apparatus.

According to further preferred embodiments of the present invention, at least one of the upright restraining section and the base section comprises an extension section which interconnects therewith to extend the height and/or width of the edge restraint apparatus. According to these embodiments, the additional extension section may lockingly engage the upright restraining section to increase the height thereof, or may engage the base section on either side of the upright section in order to extend the width of the base section.

According to certain preferred embodiments, the additional extension section is provided with interconnecting protrusions which lockingly engage interconnecting indentations of the upright section or the base section in order to lockingly interconnect these pieces. Alternatively, the upright section or the base section may be provided with the interconnecting protrusions which are received by interconnecting indentations in the additional extension section, in order to lockingly interconnect these pieces. However, any known interconnecting structure including threaded fasteners and/or adhesive may be used to connect the additional extension piece to the upright section or the base section. According to certain preferred embodiments, the interconnecting protrusions of the additional extension piece may be configured to engage the above-described break-off indentations of the base section or the upright section, such that separate interconnecting indentations for receiving the protrusions are not necessary. According to certain preferred embodiments, the additional extension section is provided with at least one weakened portion, for example indentation, score line, or different material properties, to allow its length to be adjusted by breaking, tearing, cutting, or the like of the additional extension section at the weakened portion, as described above.

According to further preferred embodiments of the present invention, the interconnection between the additional extension section and the upright section or the base section may be formed by a form-locking configuration which can be twisted, pressed, or slid together. For example, the additional extension section may comprise a curved portion which interlockingly engages a corresponding curved portion of the upright section or the base section by twisting the two pieces such that the mating curved portions engage each other. According to another preferred embodiment, the additional extension piece may include an extension flange which engages a mating extension flange of the upright section or the base section. The mating flanged portions may be configured such that the two pieces can be slid together longitudinally to form the interlocking connection.

Any of the above-described embodiments may further include a brace or buttress which connects the upright restraining section to the base section, in order to brace the upright restraining section against horizontal forces applied thereto by the structure to be restrained. The brace can be formed of a connecting section having one longitudinal edge secured to the upright section and the other longitudinal edge secured against the base section. Alternatively, there can be a series of braces formed between the upright section and base sections. These braces can be oriented in any manner to accomplish a bracing function of the upright section, as well as to provide a spike base to secure the edge restraint to the underlying base material.

The edge restraint apparatus of the present invention may have an L-shaped cross-section, an inverted T-shaped cross-section, or any other desired configuration. The entire edge restraint apparatus including both the upright restraining section and the base section are preferably made of a plastic or aluminum material and may be formed by molding, such as by extrusion or injection molding.

According to the present invention, the edge restraint apparatus advantageously is provided with variable length sections, in either or both of the upright restraining section and the base section. Consequently, the present invention advantageously improves the adjustability of an edge restraint apparatus, allowing it to be optimally sized to match the dimensions of the hard structure being restrained, as well as the installation conditions. The present invention further provides flexibility to allow adjustment of the height of the upright restraining section and/or the width of the base section at the installation site. Accordingly, the adjustability and usability of the edge restraint apparatus according to the present invention is greatly increased. The edge restraint apparatus according to the present invention further increases the ability to use the apparatus in restraining an irregular or curved configuration or border, since the bending resistance caused by the base section can be reduced or eliminated by reducing the width of the base section or by removing the base section in its entirety on at least one lateral side of the upright restraining section in the irregular or curved portion.

These and other objects, features and advantages of the present invention will become more readily apparent from the following detailed description when taken in conjunction with the accompanying drawings.

DETAILED DESCRIPTION OF THE DRAWINGS

Figure 1:
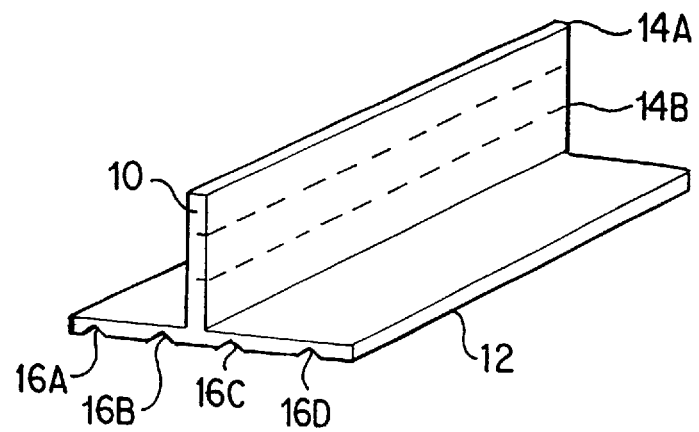
FIG. 1 is a perspective view of an edge restraint apparatus having variable length sections with indentations according to a preferred embodiment of the present invention.

Referring to FIG. 1, the edge restraint apparatus includes a substantially upright section 10 and a base section 12. The upright section 10 and the base section 12 are in the form of walls or strips. The base section 12 extends on both lateral sides of the upright section 10 and is essentially perpendicular thereto, such that the upright section and the base section form an inverted T-shaped profile at least along portions, if not all, of the longitudinal length of the upright section. A plurality of weakened portions, in this case longitudinal score lines 14A, 14B are provided in the upright section. The score lines 14A, 14B are essentially parallel to the longitudinal course of the upright section and may be provided on either or both lateral sides thereof. The score lines 14A, 14B allow unneeded portions of the upright section to be severed by breaking, tearing, cutting, or the like along the score lines to adjust the height of the upright section. A plurality of weakened portions, in this case longitudinal indentations 16A–16D are provided in the base section 12, essentially parallel to the longitudinal course of the base section. Although the Indentations 16A–16D are shown on the downwardly facing surface of the base section, indentations may be alternatively or additionally provided on the upwardly facing surface of the base section (see FIG. 3). The indentations 16A–16D reduce the cross-section of the base section 12, allowing unneeded portions of the base section to be severed by breaking, tearing, cutting, or the like along the indentations to adjust she width (the direction essentially perpendicular to the upright section) of the base section. The indentations 16A–16D have a V-shaped cross-section, which promote a clean break at the base of the V-shape. The entire edge restraint apparatus may be molded in one piece from a plastic, aluminum, or any other flexible yet strong material, such as by extrusion or injection molding.

Figure 2:
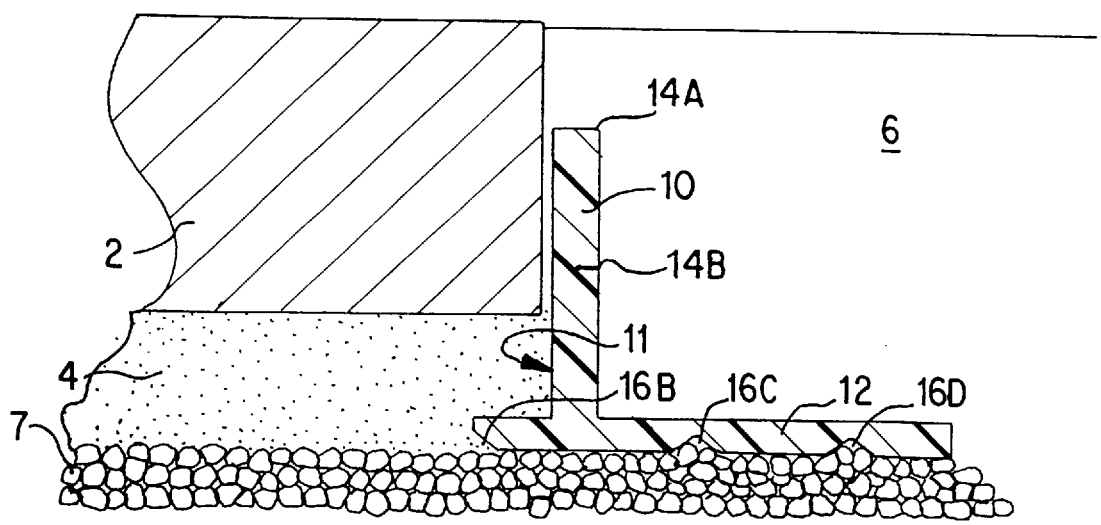
FIG. 2 is an enlarged cross-sectional view of FIG. 1 in an installed location, having portions of the edge restraint removed according to the invention.

As shown in FIG. 2, the edge restraint apparatus can be installed on a base surface 7 with the upright section 10 defining an outer peripheral boundary for a hard structure, in this case a paving stone 2, such as for a pavement surface. The edge restraint apparatus has been adjusted to a desired height by breaking off an upper portion of the upright section 10 at score line 14A, and to a desired width by breaking off a lateral portion of the base section 12 at indentation 16B. A layer of bedding sand 4 is usually disposed over the base surface 7 between the paving stone 2 and the base section 12 when forming a paving installation.

Figure 3:
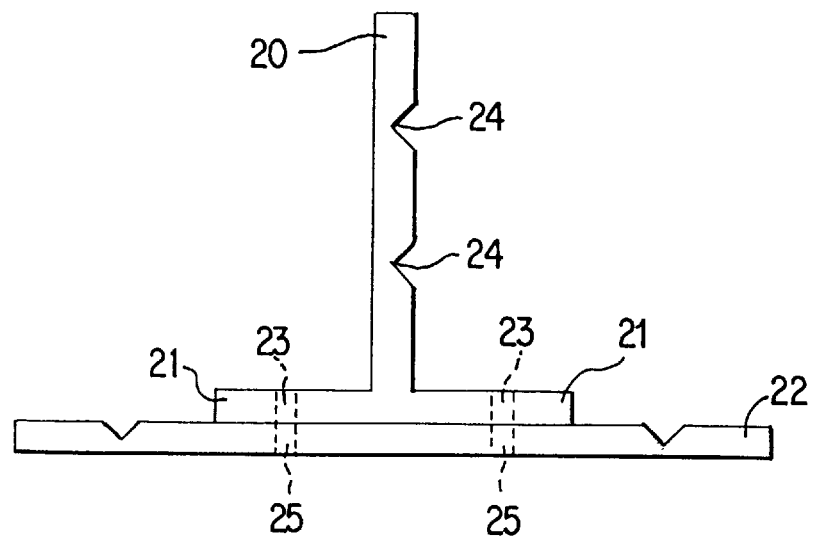
FIG. 3 is a cross-sectional view of an embodiment in which the upright section is separate from and connected to the base section.

FIG. 3 shows another embodiment, in which the upright section 20 is formed as a separate piece from the base section 22. The upright section 20 includes flanged portions 21 at a bottom end thereof extending essentially perpendicularly from each lateral side of the upright section, forming an inverted T-shaped profile. The flanged portions 21 are provided with attachment openings 23 extending therethrough. The base section 22 is provided with attachment openings 25 which correspond to the attachment openings 23 of the upright section. The upright section 20 is disposed on the base section 22 with the attachment openings 23 aligned with the attachment openings 25. A connector, such as a threaded connector or a spike is placed through the aligned attachment openings to secure the upright section 20 to the base section 22. Alternatively, the attachment openings can be eliminated and the components held together by simply nailing a spike through the two components. The upright section 20 may also be adhesively connected with the base section 22, either in addition to or as an alternative to the use of connectors, with or without the attachment openings. According to this embodiment, upright sections 20 of varying heights may be manufactured, along with base sections 22 of varying widths, and a user may select an appropriate combination of sections to form a desired size edge restrain. By providing a plurality of attachment openings, lateral adjustability of the upright section with respect to the base section 22 is allowed.

Furthermore, the upright section 20 may be provided with weakened portions, in this case indentations 24, allowing further height adjustment. The base section may be provided with weakened portions, in this case indentations 26, which may either be upwardly facing, as shown in FIG. 3, or downwardly facing as shown in FIG. 1, allowing further width adjustment.

Figure 4:
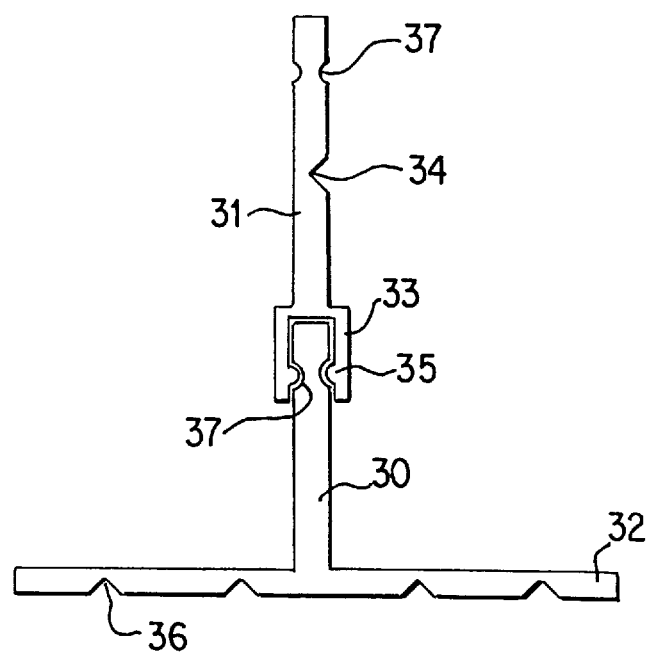
FIG. 4 is a cross-sectional view of an embodiment in which an additional extension section is interconnected with the upright section.

FIG. 4 shows an embodiment in which an upright extension section 31 is added on to the upright section 30 in order to increase its height. A pair of essentially parallel flanges 33 at the lower end of the upright extension section 31 form a jaw-shaped receptacle which receives the upper portion of the upright section 30. The flanges 33 are provided with inwardly facing projections 35, which matingly engage with recesses 37 of the upright section 30. The upright extension section 31 is made of a sufficiently resilient material, for example a plastic, to allow the projections 35 to slide over the upper end of the upright section 30 and then snap into the recesses 37 to form an interlocking connection. Alternatively, the upright section 30 may be provided with outwardly facing projections, which engage with mating recesses provided in the flanges 33. The base section may be provided with weakened portions, in this case indentations 36, and the upright extension section may be provided with weakened portions, in this case indentations 34 for further height and width adjustability. The upright extension section may also be provided with recesses 39 at an upper end thereof for engagement with additional upright extension sections. According to this embodiment, a user may add one of more upright extension sections 31 to the upright section 30 to form an edge restraint having a desired height.

Figure 5:
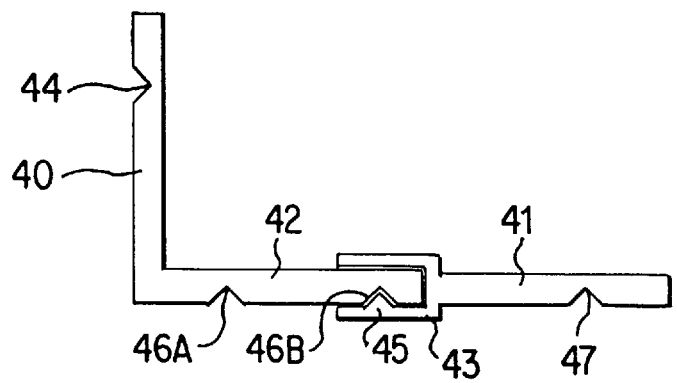
FIG. 5 is a cross-sectional view of an embodiment with an additional extension section interconnected with the base section.

FIG. 5 shows an embodiment in which a base extension section 41 is added on to the base section 42 in order to increase its width. The upright section 40 may have weakened portions, in this case indentations 44, and the base section 42 has weakened portions, in this case indentations 46A, 46B. A pair of essentially parallel flanges 43 at the end of the base extension section 31 form a jaw-shaped receptacle which receives the outer portion of the base section 42. At least one flange 43 is provided with a projection 45, which matingly engages the indentation 46B of the base section 42 to form an interlocking connection. The base extension section 41 may also be provided with weakened portions, in this case indentations 47. This embodiment also shows that for certain applications the base section need only extend on one lateral side of the upright section, forming an L-shaped cross-section.

Figure 6:
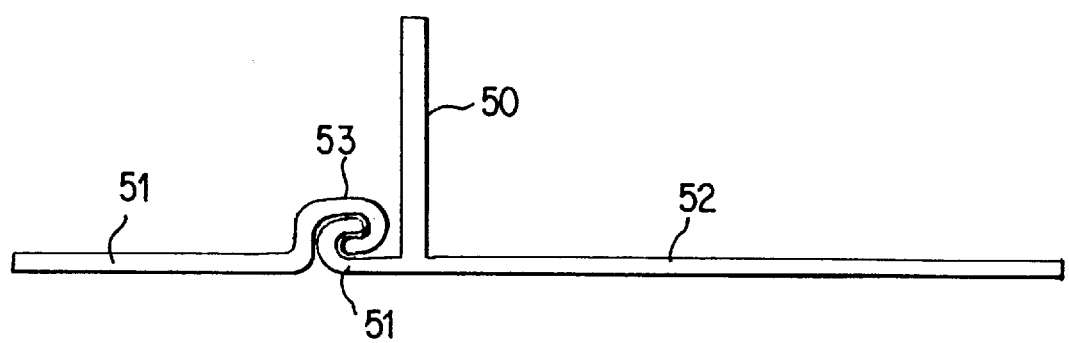
FIG. 6 is a cross-sectional view showing an alternative embodiment of the interconnection between an additional extension section and the base section.

FIG. 6 shows a form-locking interconnection between the base section 52 and an extension section 51. The extension section 51 includes a curved connecting portion 53 which matingly engage a corresponding curved connecting portion 57 of the base section 52 by twisting the two pieces such that the mating curved portions engage each other to form an interlocking connection.

Figure 7:
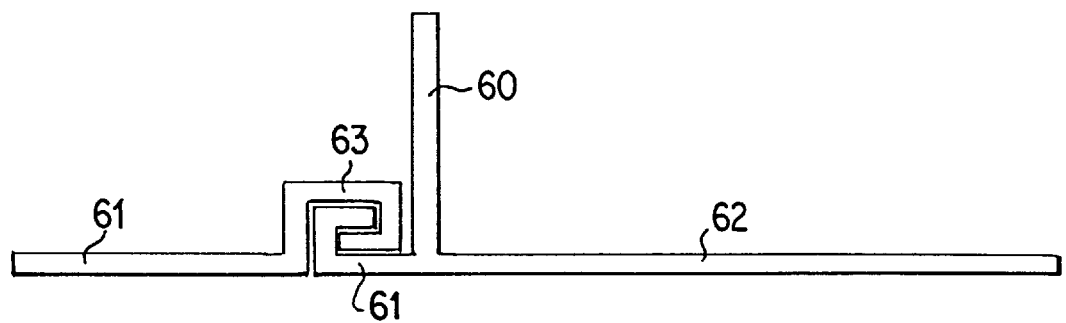
FIG. 7 is a cross-sectional view of an alternative embodiment of the interconnection between an additional extension section and the base section.

FIG. 7 shows an alternative form-locking interconnection between the base section 62 and an extension section 61. The extension section 61 includes a flanged connecting portion 63 which matingly engages a corresponding flanged connecting portion 67 of the base section 62 by longitudinally sliding the two pieces together to form an interlocking connection.

Figure 8:
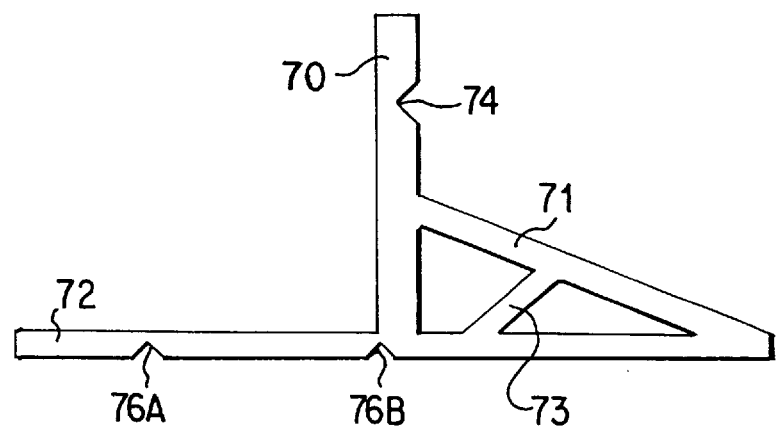
FIG. 8 is a cross-sectional view of an embodiment including a brace for the upright section.

FIG. 8 shows an embodiment which includes a brace 71 which connects the upright section 70 to the base section 72. The brace 71 braces against the horizontal forces applied to the upright section 70. While only one form of a brace is shown, one skilled in the art will recognize that other equivalent types of braces can be used such as those shown in U.S. Pat. No. 5,240,343. In FIG. 8, the upright section 70 is provided with weakened portions, in this case indentations 74 and the base section is provided with weakened portions, in this case indentations 76A, 76B.

Figure 9:
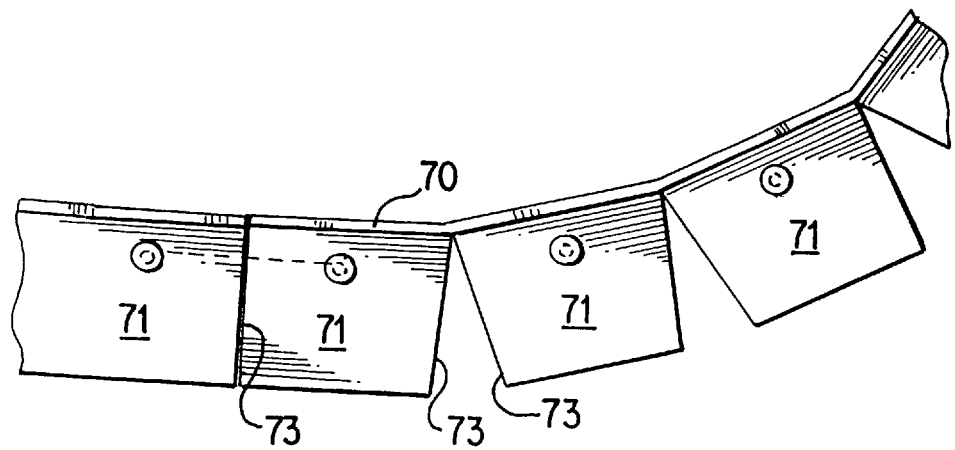
FIG. 9 is a top view showing an embodiment of the invention used in an inwardly curved border.

FIG. 9 shows one embodiment of the edge restraint apparatus of FIG. 8 in a convex curved configuration. The brace 71 and base section 72 (FIG. 8) have been cut on one lateral side of the upright section 73 along lines 73 to allowed. the upright section to be more easily bent into the curved configuration. On the other lateral side of the upright section 70, the base section 72 has been broken off indentation 76B (FIG. 8), in order to prevent interference when edge restraint is bent to form the curved configuration.

Figure 10:
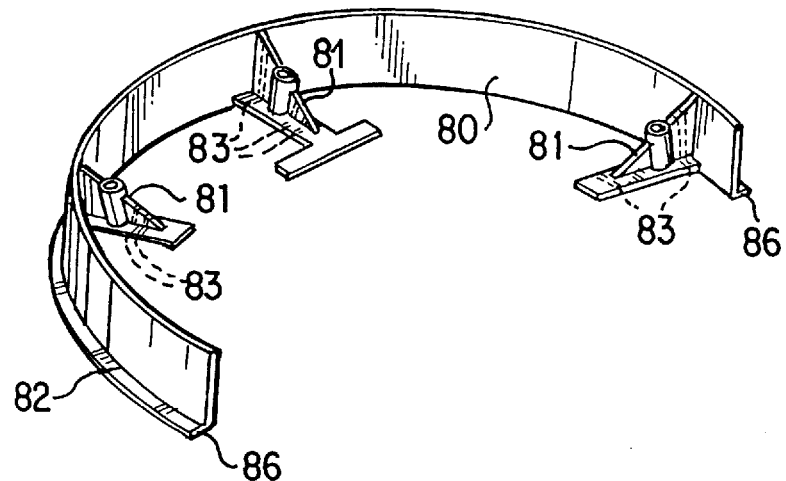
FIG. 10 is a top view showing another embodiment of the invention used in an outwardly curved border.

FIG. 10 shows another embodiment of the edge restraint a series of braces and base sections or belts in concave curved configuration. The brace 81 and base section 82 have indentations 83 to allow them to have a desired width. Further, the braces and base sections are separated from each other to facilitate the upright section being bent into the curved configuration. On the other lateral side of the upright section 80, the base section 82 has been broken off at indentation 86, in order to facilitate the bending of the edge restraint into the curved configuration.

Although the invention has been described and illustrated detail, it is to be clearly understood that the same is by way of illustration and example, and is not to be taken by way of limitation. The spirit and scope of the present invention are to be limited only by the terms of the appended claims.

What is claimed is:

1. An edge restraint apparatus for restraining a hard structure, comprising:
   a substantially upright section having a height; and
   a base section extending from a lower end of said upright section on at least one lateral sine of said upright section, said base section being essentially perpendicular to said upright section and having a width;
   wherein at least one of said height of the upright section and said width of the base section is variable.

2. An edge restraint apparatus according to claim 1, wherein at least one of said upright section and said base section have at least one longitudinal weakened portion.

3. An edge restraint apparatus according to claim 2, wherein said weakened portion comprises an indentation.

4. An edge restraint apparatus according to claim 2, wherein said weakened portion comprises a score line.

5. An edge restraint apparatus according to claim 2, wherein said weakened portion is formed by varying at least one of material properties and material types in the area of said weakened portion of the apparatus.

6. An edge restraint apparatus according to claim 1, wherein said upright section comprises a flange extending essentially perpendicularly to at least one of said lateral sides at a lower portion thereof, and wherein said base section is formed as a separate piece from said upright section and is connectable with said upright section.

7. An edge restraint apparatus according to claim 6, wherein said flange comprises at least one attachment opening extending therethrough, and said base piece comprises a mating attachment opening extending therethrough which corresponds to and is aligned with said at least one attachment opening.

8. An edge restraint apparatus according to claim 6, wherein at least one of said upright section and said base section comprise at least one longitudinal weakened portion.

9. An edge restraint apparatus according to claim 8, wherein said weakened portion comprises an indentation.

10. An edge restraint apparatus according to claim 8, wherein said weakened portion comprises a score line.

11. An edge restraint apparatus according to claim 8, wherein said weakened portion is formed by varying at least one of material properties and material types in the area of said weakened portion of the apparatus.

12. An edge restraint apparatus for restraining a hard structure, comprising:
    a substantially upright section having opposing lateral sides;
    a base section extending from a lower end of said upright section on at least one of said lateral sides, said base section being essentially perpendicular to said upright section; and
    an extension section which is engageable with one of the upright section and the base section, in order to increase the height of the upright section or the width of the base section.

13. An edge restraint apparatus according to claim 12, wherein at least one of said upright section and said base section comprise at least one longitudinal weakened portion.

14. An edge restraint apparatus according to claim 13, wherein said weakened portion comprises an indentation.

15. An edge restraint apparatus according to claim 13, wherein said weakened portion comprises a score line.

16. An edge restraint apparatus according to claim 13, wherein said weakened portion is formed by varying at least one of material properties and material types in the area of said weakened portion of the apparatus.

17. An edge restraint apparatus according to claim 12, wherein one of said extension section and said one of the upright section and the base section comprise a recess, and wherein the other of said extension section and said one of the unright section and the base section comprise a projection which matingly engages said recess.

18. An edge restraint apparatus according to claim 17, wherein at least one of said upright section and said base section comprise at least one longitudinal weakened portion.

19. An edge restraint apparatus according to claim 17, wherein said weakened portion comprises an indentation.

20. An edge restraint apparatus according to claim 17, wherein said weakened portion comprises a score line.

21. An edge restraint apparatus according to claim 13, wherein said weakened portion is formed by varying at least one of material properties and material types in the area of said weakened portion of the apparatus.

22. An edge restraint apparatus according to claim 12, wherein said extension section comprises a connecting portion and said one of the upright section and the base section comprises a mating connecting portion, said connecting portion being engageable with said mating connecting portion to form a form-locking connection.

23. An edge restraint apparatus according to claim 22, wherein said connecting portion and said mating connecting portion are curved such that said form-locking connection can be effected by twisting the curved connecting portions together.

24. An edge restraint apparatus according to claim 22, wherein said connecting portion and said mating connecting portion are configured such that said form-locking connection can be effected by longitudinally sliding the connecting portions together.

* * * * *